United States Patent
Stitelman et al.

(10) Patent No.: US 9,008,104 B2
(45) Date of Patent: Apr. 14, 2015

(54) METHODS AND APPARATUS FOR DETECTING AND FILTERING FORCED TRAFFIC DATA FROM NETWORK DATA

(71) Applicant: Media6Degrees Inc., New York, NY (US)

(72) Inventors: Ori M. Stitelman, Livingston, NJ (US); Rodney Hook, New York, NY (US); Tommy Yiwel Mei, New York, NY (US)

(73) Assignee: Dstillery, Inc., New York, NY (US)

( * ) Notice: Subject to any disclaimer, the term of this patent is extended or adjusted under 35 U.S.C. 154(b) by 208 days.

(21) Appl. No.: 13/850,099

(22) Filed: Mar. 25, 2013

(65) Prior Publication Data

US 2014/0119185 A1    May 1, 2014

Related U.S. Application Data

(60) Provisional application No. 61/697,505, filed on Sep. 6, 2012.

(51) Int. Cl.
*H04L 12/28* (2006.01)
*H04L 12/801* (2013.01)
*H04L 12/26* (2006.01)

(52) U.S. Cl.
CPC ............ *H04L 47/10* (2013.01); *H04L 43/0805* (2013.01); *H04L 43/028* (2013.01)

(58) Field of Classification Search
USPC .............................. 709/224; 726/22; 705/26.3
See application file for complete search history.

(56) References Cited

U.S. PATENT DOCUMENTS

| | | | |
|---|---|---|---|
| 7,584,287 B2 | 9/2009 | Schneider et al. | |
| 7,797,421 B1 * | 9/2010 | Scofield et al. | 709/224 |
| 8,266,687 B2 * | 9/2012 | Baldry | 726/12 |
| 8,769,080 B2 * | 7/2014 | Cancel et al. | 709/224 |
| 2005/0125195 A1 * | 6/2005 | Brendel | 702/182 |
| 2006/0106866 A1 * | 5/2006 | Green et al. | 707/104.1 |
| 2007/0195753 A1 * | 8/2007 | Judge et al. | 370/352 |
| 2008/0282338 A1 * | 11/2008 | Beer | 726/12 |
| 2011/0131652 A1 * | 6/2011 | Robinson et al. | 726/22 |

OTHER PUBLICATIONS

B. Edelman "How Spyware-Driven Forced Visits Inflate Web Site Traffic Counts," [online], Retrieved from the internet: <URL: http://www.bendelman.org/news/050707-1.html,> May 7, 2007, 7 pages.

(Continued)

*Primary Examiner* — Duc C Ho
(74) *Attorney, Agent, or Firm* — Cooley LLP

(57) ABSTRACT

A non-transitory processor-readable medium is provided that stores code representing instructions to be executed by a processor to filter data associated with an entity for a first predefined time period in response to an access by the entity at a first time to a preselected network location from a plurality of preselected network locations. The plurality of preselected network locations are associated with forced web traffic patterns. The processor is also caused to filter data associated with the entity for a second predefined time period in response to an access by the entity at a second time to a preselected network location from the plurality of preselected network locations during the first predefined time period. The second time is after the first time.

26 Claims, 7 Drawing Sheets

(56) References Cited

OTHER PUBLICATIONS

P. Ipeirotis, A Computer Scientist in a Business School, "Uncovering an advertising fraud scheme. Or 'the Internet is for porn'" [online], Retrieved from the internet: <URL: http://www.behind-the-enemy-lines.com/2011/03/uncovering-advertising-fraud-scheme.html,>.

Ori Stitelman et al. "Using Co-Visitation Networks for Classifying Non-Intentional Traffic," [online], Retrieved from the internet: <URL: http://www.troyraeder.com/papers/NITKDD13.pdf>, Copyright 2013 ACM 978-1-4503-1462—Jun. 12, 2008, 9 pages.

Ori Stitelman et al. Slide show presentation "forced internet visit networks" Workshop in Networking WIN, 2012, 18 pages.

On Stitelman et al. "Using Local Characteristics of Co-Occurrence Networks to Classify Nodes To Latent Sub-populations: Diagnosing Non-Intended Traffic In Real Time Bidding Exchanges" Workshop in Networking WIN, 2012, 5 pages.

Non-Final Office Action for U.S. Appl. No. 13/906,016, mailed Sep. 25, 2014.

Final Office Action for U.S. Appl. No. 13/906,016, mailed Mar. 20, 2014.

* cited by examiner

METHODS AND APPARATUS FOR DETECTING AND FILTERING FORCED TRAFFIC DATA FROM NETWORK DATA

CROSS-REFERENCE TO RELATED APPLICATIONS

This application claims priority to U.S. Provisional Patent Application No. 61/697,505, entitled "Methods, Systems and Media for Filtering Forced Traffic from Internet Data", filed on Sep. 6, 2012, which is incorporated herein by reference in its entirety.

BACKGROUND

Some embodiments described herein relate generally to filtering forced network traffic data from streams of network user data (e.g., Internet data) substantially in real time.

Network service providers such as, for example, advertisers or online markets use streams of network data to understand user behavior, relying on the fact that the observed actions represent the intentions of real network users. Often, however, data assumed to be associated with an actual person's visit to a network location (e.g., a website) can be produced by a programmatically-forced access, for example via a cookie, not an action resulting from an actual person's decision to visit the particular network location. Known methods have been developed to explicitly observe mechanisms that produce non-intended user accesses or to monitor network locations already known to have high rates of forced access. These known methods are, however, unable to identify new network locations with high rates of forced access that are being constantly produced. In addition, these methods are unable to identify network locations that monetize network traffic by obtaining sources of forced network traffic.

Therefore, a need exists to overcome the shortcomings of the known methods by filtering non-intentional actions and/or events from streaming network data as the actions and/or events get disseminated around a communication network.

SUMMARY

In some embodiments, a non-transitory processor-readable medium stores code representing instructions to be executed by a processor, the code comprising code to cause the processor to filter data associated with an entity for a first predefined time period in response to an access by the entity at a first time to a preselected network location from a set of preselected network locations. The set of preselected network locations are associated with forced web traffic patterns. The processor is also caused to filter data associated with the entity for a second predefined time period in response to an access by the entity at a second time to a preselected network location from the set of preselected network locations during the first predefined time period. The second time is after the first time.

DETAILED DESCRIPTION

Figure 1:
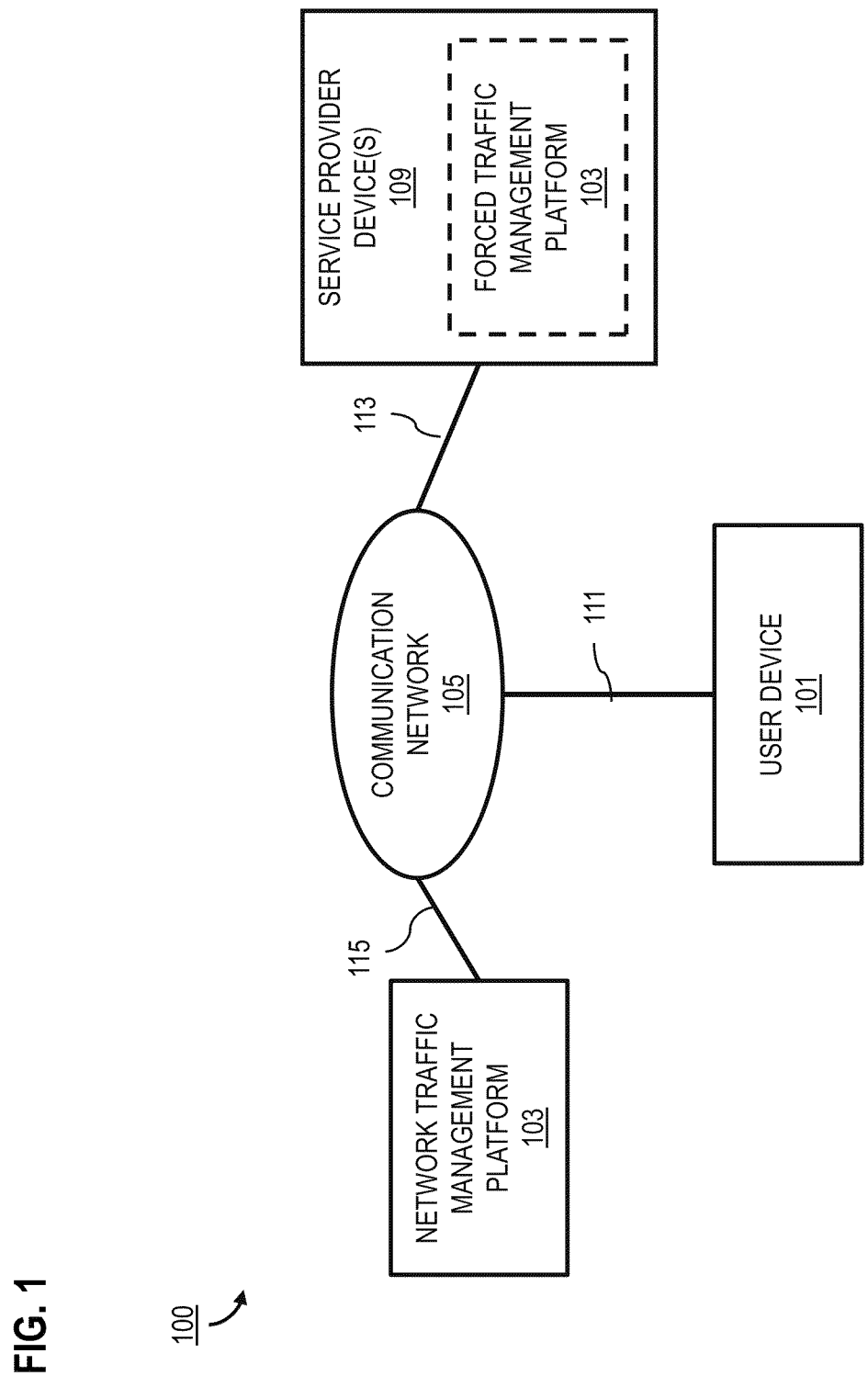
FIG. 1 is a schematic block diagram of a computer system in which filtering data associated with forced traffic can be performed, according to an embodiment.

Known network traffic analysis systems observe various actions over networks, collect data associated with those actions, analyze the collected data, and provide analysis results to a variety of applications such as, for example, bid request analysis and selection from online real-time bidding auctions, display advertising, etc. For example, in display advertising, targeting models can be used to determine the best individuals to receive advertisements for a given advertising campaign. These targeting models are typically a function of a user's past behavior or intentions. Forced visit data, however, contaminates these targeting models because the forced visit data does not reflect the user's past intentions. By filtering out the non-intentional, or forced, traffic data from the data used to define the targeting models or used as input to the targeting models, this contamination can be removed from the data.

Methods and apparatus are described herein to provide traffic data filtering within a communication network. In some embodiments, a non-transitory processor-readable medium stores code representing instructions to be executed by a processor, the code comprising code to cause the processor to filter data associated with an entity for a first predefined time period in response to an access by the entity at a first time to a preselected network location from a set of preselected network locations. The set of preselected network locations are associated with forced web traffic patterns. The processor is also caused to filter data associated with the entity for a second predefined time period in response to an access by the entity at a second time to a preselected network location from the set of preselected network locations during the first predefined time period. The second time is after the first time.

In some embodiments, a non-transitory processor-readable medium stores code representing instructions to be executed by a processor, the code comprising code to cause the processor to receive a first data associated with an access by an entity to a preselected network location from a set of preselected network locations. The set of preselected network locations is associated with forced web traffic patterns. The processor is also caused to send a first signal to filter data associated with the entity for a first predefined time period based, at least in part, on the first data. The processor is also caused to receive a second data associated with an access by the entity to a network location (e.g., a website location) during the first predefined time period. The processor is further caused to send a second signal to modify filtering of data associated with the entity based, at least in part, on the second data.

In some embodiments, a non-transitory processor-readable medium stores code representing instructions to be executed by a processor, the code comprising code to cause the processor to, for each preselected network location from a set of preselected network locations, receive data associated with an access to that preselected network location by an entity, during a first predefined time period. The processor is also caused to define a model of behavior for the entity based, at least in part, on the data. The processor is further caused to send a signal to filter data associated with the entity for a second predefined time period based, at least in part, on the model of behavior of the entity.

Web traffic can be analyzed by capturing the traffic statistics found in the web server log file, an automatically generated list of all pages served. Web traffic typically measures the popularity of both websites and individual pages or sections within a website. As used herein, "forced network traffic" includes non-intentional visits to websites that tend to inflate traffic counts for a given network location. Forced network traffic can be caused by spyware, virus, or other malicious code. Forced network traffic typically directs a user's browser to visit websites, perform calls on advertisement servers, simulate clicks on advertisements, or bid on products, without the knowledge or deliberate action of the user.

As used herein, "user" can be a person, a module, a device, or an application. In some of the embodiments discussed, a user is referred to as a person using the user device via one or more user interfaces. Additionally/alternatively, a user can be a device, a module of a device, or an application such as, for example, a malware, a virus, a bidding application, an advertisement engine, etc., that can cause network traffic that can be managed by the described methods and apparatus.

As used herein, the singular forms "a," "an" and "the" include plural referents unless the context clearly dictates otherwise. Thus, for example, the term "an "entity" is intended to mean a single entity or multiple entities (e.g., entities with similar access history or similar models of behavior, etc.).

FIG. 1 is a schematic block diagram of a computer system in which filtering forced traffic data can be performed, according to an embodiment. The computer network system 100 includes at least one user device 101, a network traffic management platform 103, a communication network 105, and at least one service provider device(s) 109, which can be operatively coupled to one or more user devices 101 or other service provider device(s) 109 via the communication network 105. Note that the network traffic management platform 103 or some of its components can be embedded within the service provider device(s) 109, or be external to the service provider device(s) 109, and operatively coupled to one or more user devices 101 or one or more service provider device(s) 109 via the communication network 105. Any of the devices or platforms of the computer network system 100 can be equipped with local memory/storage spaces (not shown in FIG. 1). Furthermore, the devices and platforms of the system 100 can have access to centralized or distributed memory/storage spaces (not shown in FIG. 1) through the communication network 105. Additionally, a user device 101, a network traffic management platform 103, and a service provider device(s) 109 each can include one or more processors, performing processes associated with the services provided to the user devices 101 (each not shown in FIG. 1). Thus, FIG. 1 is merely an example illustrating the types of devices and platforms that can be included within a computer network system 100.

Communication network 105 can for example be any communication network, such as the Internet, configurable to allow the user device 101, the network traffic management platform 103, and the service provider device(s) 109 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the user device 101 can be operatively coupled to a cellular network; the service provider device(s) 109 and/or the network traffic management platform 103 can be operatively coupled to a fiber-optic network. The cellular network and fiber-optic network can each be operatively coupled to one another via one or more network bridges, routers, switches, and/or gateways such that the cellular network and the fiber-optic network are operatively coupled to collectively form a communication network. Alternatively, the cellular network and the fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the user device 101 is operatively coupled to communication network 105 via network connection(s) 111; service provider device(s) 109 is operatively coupled to communication network 105 via network connection(s) 113; and the network traffic management platform 103 is operatively coupled to communication network 105 via network connection(s) 115. Network connections 111, 113, and 115 can be any appropriate network connection for operatively coupling user device 101, service provider device(s) 109, and the network traffic management platform 103.

A network connection 111, 113, and 115 can be a wireless network connection such as, for example, a wireless fidelity ("Wi-Fi") or wireless local area network ("WLAN") connection, a wireless wide area network ("WWAN") connection, and/or a cellular connection. A network connection 111, 113, and 115 can be a wired connection such as, for example, an Ethernet connection, a digital subscription line ("DSL") connection, a broadband coaxial connection, and/or a fiber-optic connection.

As mentioned above, in some instances, a computer network system 100 can include more than one user device 101, more than one network traffic management platform 103, and more than one service provider device(s) 109. A user device 101, a network traffic management platform 103, and/or a service provider device(s) 109, can be operatively coupled to the communication network 105 by heterogeneous network connections. For example, a first user device 101 can be operatively coupled to the communication network 105 by a WWAN network connection, another user device 101 can be operatively coupled to the communication network 105 by a DSL network connection, and a network traffic management platform 103 can be operatively coupled to the communication network 105 by a fiber-optic network connection. The service provider device(s) 109 can be, for example, a web server configured to provide various applications to electronic devices, such as user device 101.

The user device 101 can be any of a variety of electronic devices that can be operatively coupled to communication network 105. A user device 101 can be for example a personal computer, a tablet computer, a personal digital assistant (PDA), a cellular telephone, a TV, a portable/mobile Internet device and/or some other electronic communication device. The user device 101 can include a web browser configured to access a webpage or website hosted on or accessible via the service provider device(s) 109 over communication network 105. A service provider 109 can be a server provided by an organization that provides access to the Internet. A service provider 109 can be organized in various categories such as, for example, commercial, community owned, non-profit, privately-owned, etc. The user device 101 can be configured to support, for example, HyperText Markup Language (HTML)

using JavaScript. The user device 101 can include a web browser such as, for example, Firefox®, Safari®, Dolphin®, Opera® and Chrome®. An Internet page or website can be accessed by a user of a web browser at a user device 101 by providing the web browser with a reference such as a uniform resource locator (URL), for example, of a webpage. For example, a user of a user device 101 can access a service provider device(s) 109 via a URL designated for the service provider device(s) 109. In some instances, user device 101 can include specialized software for accessing a web server other than a browser, such as, for example, a specialized network-enabled application or program. In some instances, portions of a website accessible via a web server can be located in a local or remote memory space/data store accessible to the web server. The portions of the website can be stored in the memory/data store in a database, a data warehouse, a file, etc. A user device 101 can also include a display, monitor or user interface (not shown in FIG. 1), a keyboard, various communication or input/output (I/O) ports (e.g., a USB port), and other user interface features, such as, for example, digital pens, mice, touch screen controls, audio components, and/or video components (each not shown). A user device 101 can be operatively coupled to communication network 105 via a user interface and a network connection 111.

Figure 2:
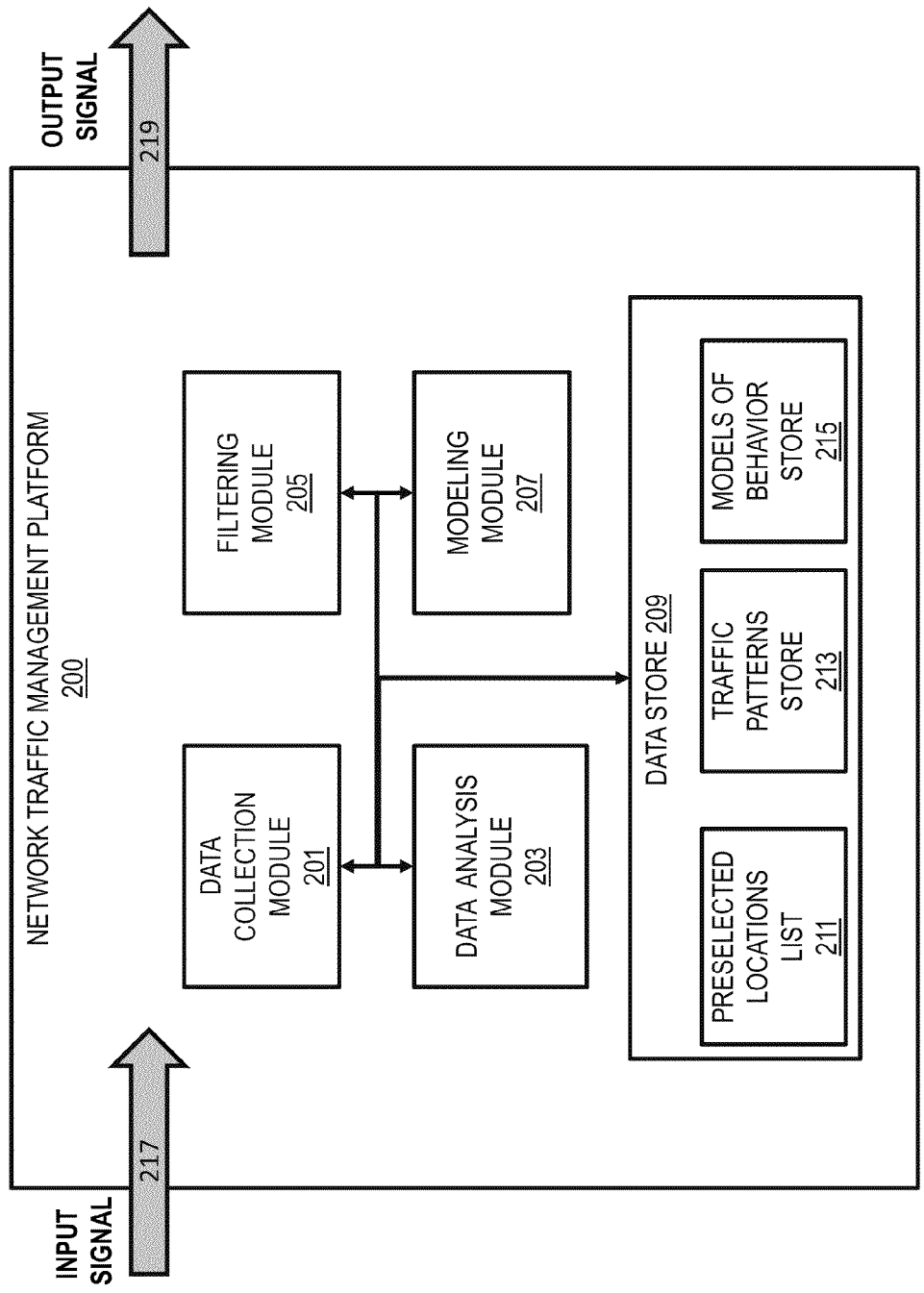
FIG. 2 is a schematic illustration of a network traffic management platform, according to an embodiment.

FIG. 2 is a schematic illustration of a network traffic management platform, according to an embodiment. Network traffic management platform 200 can be similar to the network traffic management platform 103 of FIG. 1. As shown in FIG. 2, a network traffic management platform 200 can include a data collection module 201, a data analysis module 203, a filtering module 205, a modeling module 207 and a data store 209. The data store 209 can include a repository of preselected network locations 211, a repository of traffic patterns 213, a repository of models of behavior 215, as well as any data used and/or stored by the components of the network traffic management platform 200. Furthermore, the network traffic management platform 200 can communicate with other components of a computer network system (e.g., computer network system 100 of FIG. 1) via input signals 217 and output signals 219.

In various instances, the network traffic management platform 200 and its components can be located anywhere within a communication network system 100 such as that shown in FIG. 1 including, but not limited to, within the service provider device(s) 109, or in separate network locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The network traffic management platform 200 can provide traffic management for service provider device(s) 109. In some embodiments, the network traffic management platform 200 can receive a request from a service provider device 109 of FIG. 1 for traffic analysis related to services provided by the service provider device 109. In such embodiments, the data collection module 201 can collect data associated with network users (e.g., received via input signal 217) including network locations from which the users access the network (e.g., via a user device 101), or network locations associated with the service provided by the service provider device 109, that the user of a user device 101 attempts to access. For example, the data can include data associated with network locations for the Internet webpages accessed by the user via user device 101. The users can be identified by various methods such as, for example, cookies; the network locations the user devices 101 visit can be recorded, for example, whenever a web bug activates (e.g., a web beacon, a pixel tag) on a website that is visited by one of the cookies. Note that although some embodiments described herein can identify user devices 101 by cookies, this is merely illustrative. Users (user devices 101) can be identified using various approaches. Note also that suitable approaches other than monitoring web bug activations can be used for recording user device 101 access to network locations. For example, the network traffic management platform 200 can use a combination of non-personally identifying information to identify users and can monitor online activity of the users via user devices 101.

The web stream data associated with users' behavior in accessing a network(s) or portions of a network(s) via user devices 101 are typically interpreted as a representative of the intentions of actual human users. Such data, however, can often be produced by a programmatically-forced entity (e.g., a cookie) and not a result of an actual human user deciding to visit a particular network location.

Known methods have been developed that explicitly observe mechanisms that produce non-intended users. These methods distinguish websites with high volumes of non-intended traffic from websites that have low or no non-intended traffic. Other known methods use co-visitation behavior of various users (e.g., users frequently visit some network locations) to identify network locations with high rates of forced visitation. These known methods, however, fail to identify and filter data associated with high non-intended traffic for network locations.

In some instances, the network traffic management platform 200 uses a list of preselected network locations to identify non-intended traffic associated with the preselected network locations and characteristics of such non-intended traffic including, for example, the network users initiating such traffic. The network traffic management platform 200 can then filter data associated with the identified non-intended traffic and/or the initiating users from network traffic. The list of preselected network locations can include websites with a history of non-intended traffic, websites associated with suspicious entities (e.g., persons, associations, companies, etc.), etc. The list of preselected network locations can also include service provider devices 109 with a history of association with non-intended traffic such as, for example, service provider devices 109 that have provided and maintained websites with non-intended traffic in the past. In some embodiments, adding a service provider device 109 to the list of preselected network locations can automatically add websites associated with that service provider device to the list.

In some instances, the data analysis module 203 uses a list of preselected network locations list 211 in data store 209 against which to compare data collected by data collection module 201. The preselected network locations list 211 can include network locations that have a history of high rates of forced traffic.

In some instances, the data analysis module 203 can analyze traffic data for various network locations to recognize traffic patterns for those network locations or associated with various user devices 101. The data analysis module 203 can store the analysis results including the recognized traffic patterns in traffic patterns store 213. The filtering module 205 can use the analysis results produced by the data analysis module 203, the preselected network locations list 211 and the traffic patterns store 213 to filter data associated with forced network traffic as it gets disseminated around the network (e.g., the Internet).

By doing so, the filtering module 205 filters non-intentional actions/events from streaming network data. For example, the filtering module 205 can filter data associated with cookies or from user devices 101, in response to such data being sent from one website to another website in a non-natural pattern of network browsing. Note that traffic associated with some cookies can be sent back and forth between websites at rates that cannot be explained by a human's natural web browsing behavior. Accordingly, the data representing the traffic associated with such cookies and non-human access can be identified as data associated with non-intended traffic.

In some embodiments, the modeling module 207 produces various models of behavior using the data collected by the data collection module 201 and analysis results provided by the data analysis module 203. The modeling module 207 can store the derived models of behavior in the models of behavior store 215. Examples of models of behavior are disclosed in the U.S. Provisional Patent Application No. 61/697,482, entitled "Methods, Systems and Media for Detecting Non-intended Traffic using Co-visitation Networks", filed on Sep. 6, 2012, which is incorporated herein by reference in its entirety.

Note that various behaviors or behavioral patterns historically tend to happen at particular network locations (e.g., websites) and for certain users/user devices 101. The number of new websites that exhibit a behavior can grow and the source of the associated traffic can sometimes be from the same known websites. Accordingly, the filtering module 205 can use the data associated with users accessing preselected network locations from the preselected network locations list 211 via a user device 101 and filter data representing the actions associated with those users and/or user devices 101 for a certain period of time after a known suspicious action such as, for example, accessing a preselected network location from the preselected network locations list 211.

In some embodiments, the network traffic management platform 200 can provide filtering of data associated with network traffic to service provider device(s) 109 such that, for example, the filtering reveals intentional, user-driven access to services provided by the service provider device 109 and blocks data associated with non-intentional programmed accesses. The network traffic management platform 200 can also provide data analysis results produced by the data analysis module 203, and/or models of behavior produced by the modeling modules 207 to the service provider device 109 via an output signal 219.

Figure 3:
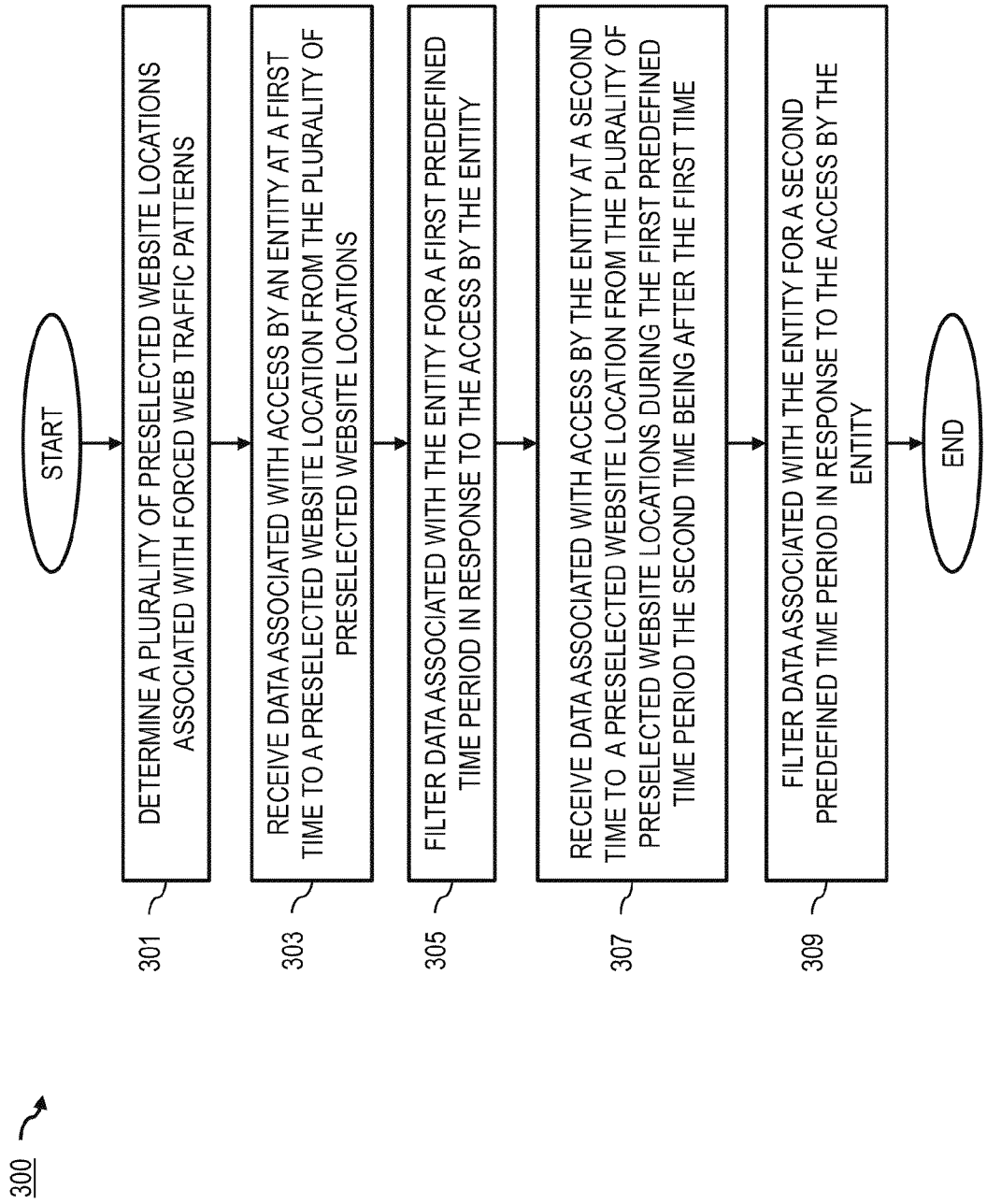
FIGS. 3-5 are flowcharts of processes for providing filtering of data associated with forced traffic, according to an embodiment.
Figure 4:
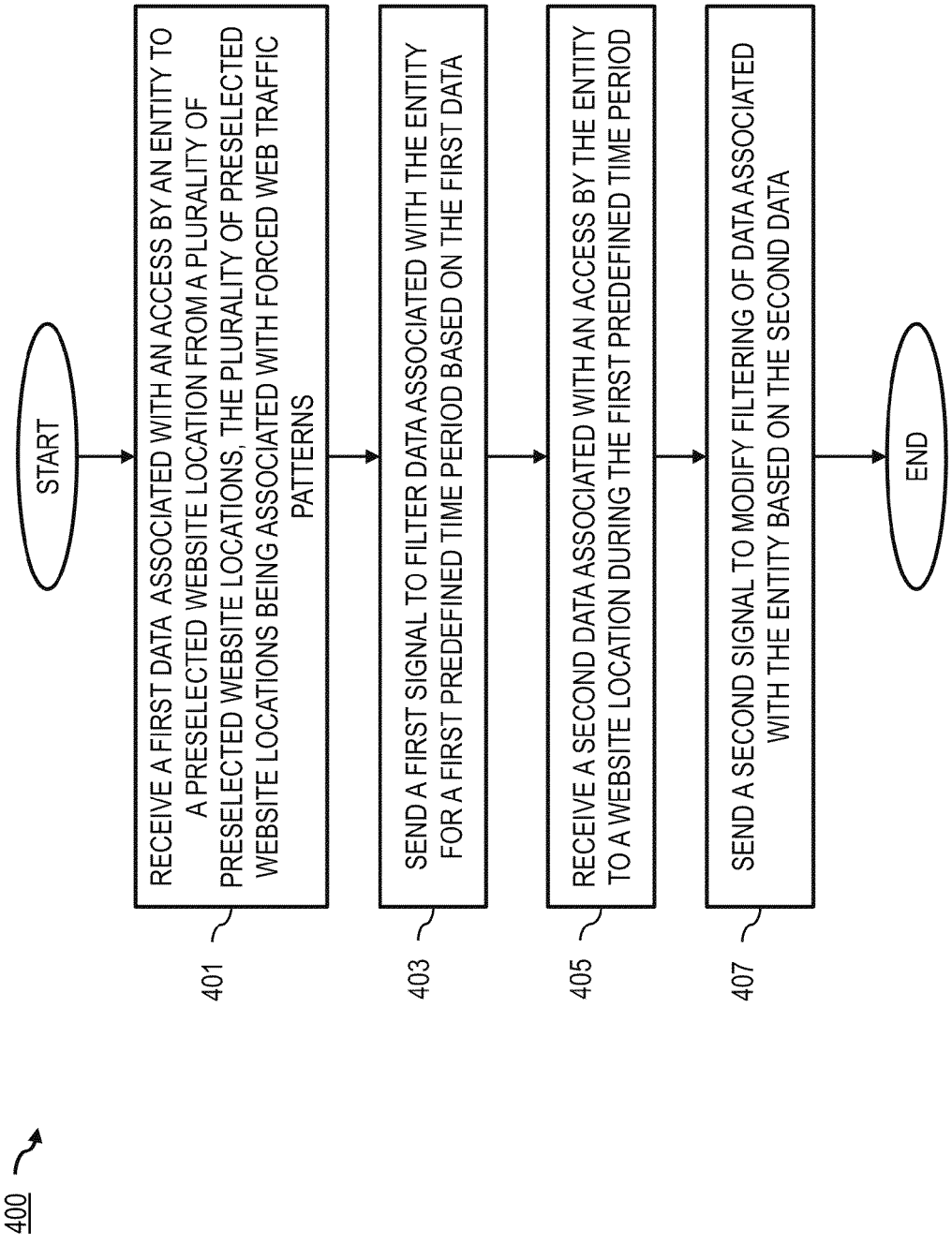
Figure 5:
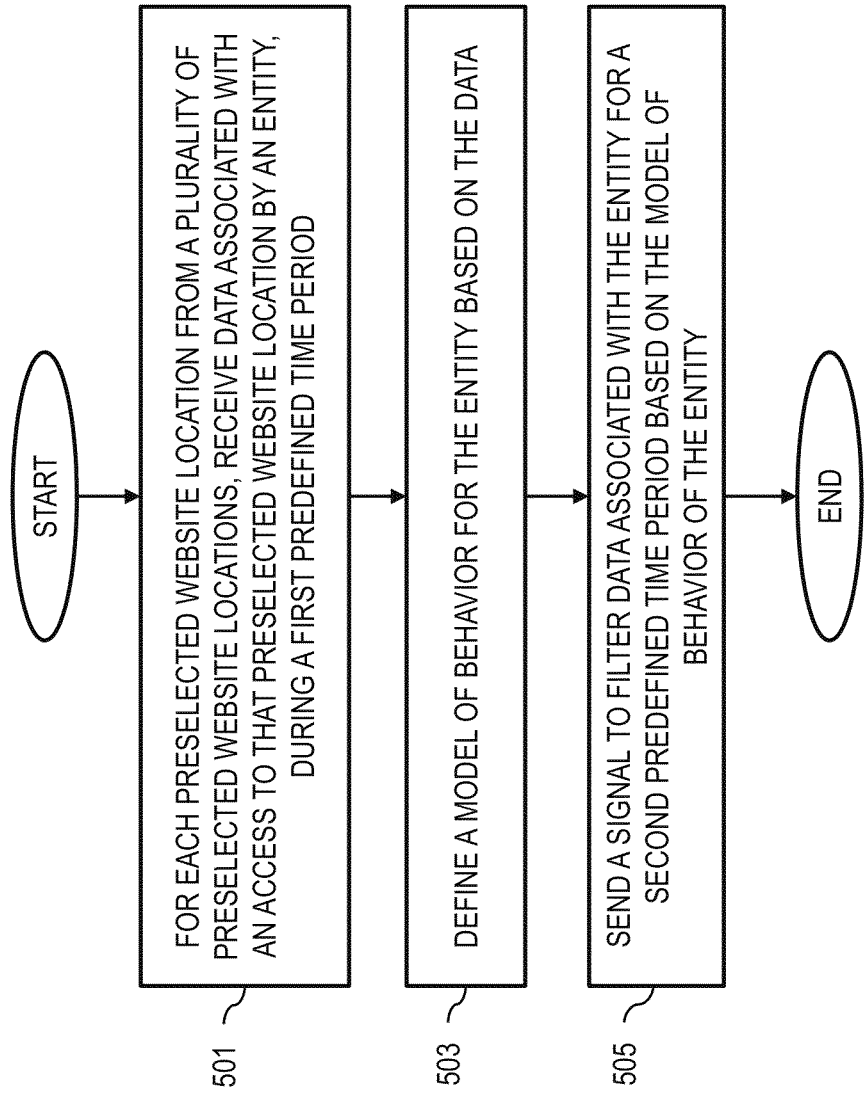

FIGS. 3-5 are flowcharts of processes for providing filtering of data related to forced traffic, according to an embodiment. FIG. 3 shows a flowchart 300 for filtering data based on user access to preselected network locations for certain periods of time, according to an embodiment. At 301, a list of preselected network locations associated with forced web traffic patterns is determined (for example, by the network traffic management platform 200 of FIG. 2). The list (or portions of the list) can be received from user devices 101, service provider device(s) 109, etc., across the communication network 105. The list is stored in a memory or storage location such as, for example, the preselected network locations list 211 of data store 209. Additionally, the preselected network locations list 211 can be updated by adding new network location indicators for websites that produce forced traffic or by removing the network location indicators for websites that do not produce forced traffic behavior for certain periods of time. The updates may be identified based on the data analysis results provided by a data analysis component (e.g., the data analysis module 203).

At 303, data associated with access by an entity to a preselected network location from a preselected network locations list at a first time T1 is received, for example, from a service provider device 109 via input signal 217. The entity can be a user device 101; a user using a user device 101 identified by at least a user ID, a programmed entity disguised as a user (e.g., a spyware or a virus), etc. The data collection module 201 can store the received data in data store 209.

At 305, the data associated with the entity is filtered for example by a filtering module 205, for a first predefined time period P1 in response to the access by the entity to a preselected network location from the preselected network locations list 211. The data associated with an entity can be any traffic data such as a visit to a website location, a bid request in an online real-time bidding auction, etc. Furthermore, the time T1 and/or time period P1 can be predefined for example by the data analysis module 203 or can be predefined during network configuration and stored in data store 209. Additionally, the time T1 and/or the time period P1 can be modified based on data analysis results, based on models of behavior for example provided by the modeling module 207, or based on various factors associated with the network such as network type, network configuration, types of services provided by the service provider device(s) 109, etc.

At step 307, data associated with access by the entity at a second time T2 (T2>T1) to a preselected network location from the preselected network locations list 211 during the first predefined time period P1 is received. For example, the data collection module 201 can monitor accesses by the entity during the time period P1. For example, if an access by the entity to a preselected network location takes place at time T2, at 309, the filtering module 205 can filter data associated with the entity for a second predefined time period P2 in response to the access by the entity at time T2. The time T2 and/or the time period P2 can be modified based on data analysis results, for example, by the data analysis module 203, based on models of behavior, for example, provided by the modeling module 207, or based on various factors associated with the network such as network type, network configuration, types of services provided by the service provider device(s) 109, etc. In some exemplary cases, the filtering module 205 can use a counter for measurement of time periods P1 and P2. In such cases, the filtering module 205 can reset the counter at time T2 when receiving data associated with an access by an entity to a preselected network location from preselected network locations list 211.

In some exemplary embodiments, the filtering module 205 can activate a counter to count the number of accesses by an entity to a preselected network location from the preselected network locations list 211 during a time period P1. The filtering module 205 can perform filtering of the data associated with the entity based on the counted number. In such embodiments, when the filter module 205 filters data associated with the entity for a second predefined time period P2, the filtering module 205 can send a signal to stop the counter of the number of accesses by the entity to a preselected network location from the preselected network locations list 211. The counter can then count the number of accesses by the entity to a preselected network location from the preselected network locations list 211 during the time period P2 and the filtering module 205 can perform filtering of the data associated with the entity based on the counted number.

For example, the network traffic management platform 200 can receive data associated with new forced web traffic patterns from the communication network 105, or from the service provide device(s) 109. Additionally/alternatively, data associated with new forced web traffic patterns can be derived, for example, from the data collected by the data collection module 201 by the data analysis module 203 or by the modeling module 207. In such embodiments, the filtering module 205 modifies filtering of data associated with the user device 105 or a user in response to receiving the data associated with the new forced web traffic pattern. The modification may include unfiltering of the data, or modifying any of the time periods P1 or P2.

In some instances, the entity attempting to access a preselected network location from the preselected network locations list 211 can be associated with a spyware or a virus. In such instances, the filtering module 205 can filter data associated with the entity as non-intentional traffic based on the access by the entity to a preselected network location from the preselected network locations list 211, based on traffic patterns in the traffic patterns 213, based on data analysis results provided by the data analysis module 203, based on models of behavior 215, based on models of behavior produced by the modeling module 207, or a combination thereof.

In some instances, the traffic pattern representations stored at the traffic patterns 213 can include representations of forced traffic patterns. A forced traffic pattern can represent short periods of burst of forced web traffic or long periods of continuous forced traffic. In such instances, the filtering module 205 can modify filtering of data associated with an entity based on periods of duration of the forced web traffics.

FIG. 4 shows a flowchart 400 for filtering data and the modification of filtering based on user access to preselected network locations for certain periods of time, according to an embodiment. At 401, a first data associated with an access by an entity to a preselected network location from preselected network locations list 211 is received, for example by the network traffic management platform 200. The entity can be a user device 101; a user using a user device 101 identified by at least a user ID, a programmed entity disguised as a user (e.g., a spyware or a virus), etc. The data can be stored, for example by the data collection module 201, in a data storage location such as the data store 209. Each preselected network location from the preselected network locations list 211 is associated with or is subject to forced web traffic patterns. The list (or portions of the list) can be received from user devices 101, service provider device(s) 109, etc. across the communication network 105, for example, by the network traffic management platform 200 via input signals 217. The network traffic management platform 200 can store the list in the preselected network locations list 211 on data store 209. Additionally, the preselected network locations list 211 can be updated, for example by the network traffic management platform 200, by adding new location indicators for websites that produce forced traffic or by removing the location indicators for websites that do not produce forced traffic behavior for certain periods of time. The updates may be identified based on the data analysis results provided by the data analysis module 203.

At 403, a first signal is sent, for example by the filtering module 205, to filter data associated with the entity for a first predefined time period S1 based, at least in part, on the first data. The data associated with an entity can be any traffic data such as a visit to a website location, a bid request in an online real-time bidding auction, etc. The time period S1 can be predefined, for example by the data analysis module 203, or can be predefined during network configuration and stored in data store 209. Additionally, the time period S1 can be modified based on data analysis results, for example by the data analysis module 203, based on models of behavior, for example provided by the modeling module 207, or based on various factors associated with the network such as network type, network configuration, types of services provided by the service provider device(s) 109, etc.

At step 405, a second data associated with an access by the entity to a website location during the first predefined time period S1 is received, for example by the data collection module 201. Note that the access by the entity to a website location during the first predefined time period S1 can be to a preselected network location from the preselected network locations list 211, or to any other website location. Furthermore, the second data can include data associated with a pattern of behavior of the entity.

At 407, a second signal is sent, for example by the filtering module 205, to modify filtering of data associated with the entity based on the second data. The modification of the filtering can depend, for example, on whether the second data is associated with an access by the entity to a preselected network location or to a non-preselected network location. In some instances, the second signal sent to modify filtering can stop filtering of data associated with the entity, if the second data indicates no access to a preselected network location from the preselected network locations list 211 during the first predefined time period S1. In other instances, the second signal sent to modify filtering can filter data associated with the entity for a second predefined time period S2, if the second data indicates at least one access to a preselected network location from the preselected network locations list 211 during the first predefined time period S1. The end time of the second predefined time period S2 is after the end time of the first predefined time period S1. Thus, an access to a preselected network location from the preselected network locations list 211 during the first predefined time period S1, can cause filtering of the data associated with the entity for an extended period of time. The length of the time period S2 can be equal, shorter, or longer than the length of the first time period S1. For example, the length of the time period S2 can depend, at least, on analysis results provided by the data analysis module 203 by analyzing the first and the second data.

In some instances, the second signal sent to modify filtering can stop or reset a counter that measures time periods S1 and S2. In such cases, a signal can be sent to reset the counter when receiving the second data associated with an access by the entity to a preselected network location from the preselected network locations list 211. The filtering module 205 can also send a signal to stop the counter when receiving the second data indicating no access by the entity to a preselected network location from the preselected network locations list 211.

In some instances, if the second data indicates no access by the entity to a preselected network location from the preselected network locations list 211 during the first predefined time period S1, a first counter can be activated, for example by the filtering module 205, to count a number of accesses by the entity to preselected network locations from the preselected network locations list 211 during a time period S2. Similarly, a second counter can be activated to count a number of accesses by the entity to non-preselected network locations during the time period S1. Subsequently, data associated with the entity can be filtered based on the counted numbers by the first or the second counters. In such instances, when the data associated with the entity is filtered for a second predefined time period S2, a signal can be sent to stop the first counter and/or the second counter. The first counter and the second counter can then count the number of accesses by the entity to preselected network locations from the preselected network locations list 211 and the number of accesses by the entity to non-preselected network locations during the time period S2, respectively. The filtering of the data associated with the entity can then be modified based on the counted numbers by the first counter and the second counter.

In some instances, if the second data indicates no access to a preselected network location from the preselected network locations list 211 during the first predefined time period S1, a signal can be sent to start or restart the first counter for the number of accesses by the entity to a preselected network location from the preselected network locations list 211.

In some instances, the forced web traffic patters associated with the preselected network locations list 211 can include at least one temporary period of forced web traffic. In such instances the second signal sent, for example by the filtering module 205, to modify filtering can include code to filter data associated with the entity during the at least one temporary period of forced web traffic.

FIG. 5 shows a flowchart 500 for filtering data based on a model of behavior, according to an embodiment. At 501, for each preselected network location from a preselected network locations list 211, data associated with an access to that preselected network location by an entity is received, for example by the modeling module 207, during a first predefined time period U1. The data can be received, for example, from other modules of the network traffic management platform 200, directly from an input signal 217, or from the data store 209.

At 503, a model of behavior is defined for the entity based, at least in part, on the received data. Additionally, other data collected by the data collection module 201, analysis results, for example from the data analysis module 203, traffic patterns from the traffic patterns 213, etc. can be used in defining the model of behavior. The defined models can be stored in models of behavior store 215 on data store 209. Furthermore, various methods can be used for behavior modeling such as, for example, machine learning methods, pattern recognition methods, etc.

At 505, a signal is sent to filter data associated with the entity for a second predefined time period U2 based, at least in part, on the defined and stored model of behavior of the entity. In the example of flowchart 500, the filtering of data, for example, by the filtering module 205 is based on models of behavior. In various instances, however, the data can be filtered based on a combination of models of behavior and access to preselected network locations from the preselected network locations list 211 as previously described with regards to FIGS. 3 and 4.

In some instances, a signal can be sent to stop filtering of the data associated with an entity based, at least in part, on the model of behavior of the entity. In some instances, the code to filter data includes code to filter data based on simultaneous multiple accesses to a preselected network location from the preselected network locations list 211 by a set of entities.

In some instances, data associated with an access to a non-preselected network location by the entity, during the first predefined time period U1, is received. In such instances, the model of behavior for the entity is defined based, at least in part, on the data associated with the access to the non-preselected network location by the entity. The model of behavior of an entity can include behavior of the entity while accessing various locations including preselected network locations, non-preselected network locations, etc. The model of behavior for an entity can also be defined based on types of the websites accessed by the entity, access times, access dates, access durations, etc.

In some instances, a forced web traffic pattern is defined based, at least in part, on the model of behavior of one or more entities. In such instances, the signal to filter data associated with an entity can be sent based on the defined forced web traffic patterns. The defined forced web traffic patterns can be stored in a storage location such as, for example, the traffic patterns 213 of the data store 209.

In some instances, the signal to filter data associated with an entity can be sent based on forced web traffic patterns previously defined and stored, for example in the traffic patterns 213. The forced web traffic patterns can be defined based, at least in part, on an analysis of the models of behavior of multiple entities.

Figure 6:
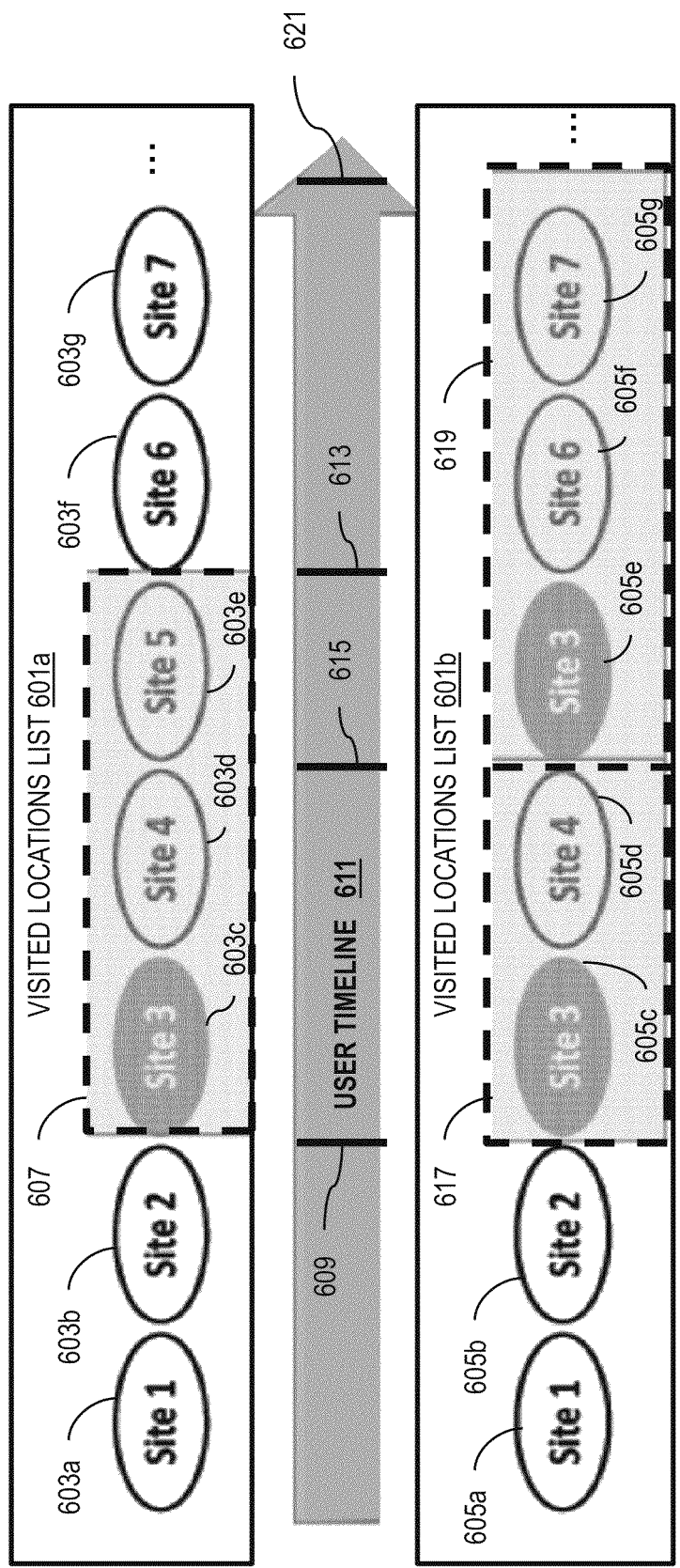
FIG. 6 is an illustration of a sample data filtering process and timeline, according to an embodiment.

FIG. 6 is an illustration of a sample data filtering process and timeline, according to an embodiment. The visited locations lists 601a and 601b of FIG. 6 are lists of network locations (e.g., websites) accessed by a user device in two different scenarios. For example, a network traffic management platform (such as network traffic management platform 200 of FIG. 2) identifies a list of suspicious website locations to use as preselected network locations (e.g., preselected network locations list 211 of FIG. 2). The preselected network locations list is a list of network locations that are known to exhibit forced patterns of traffic.

In the first example shown in FIG. 6, with visited locations list 601a, first data indicating that a user device has accessed a predefined (e.g., suspicious) location 603c is received at time stamp 609 during the user timeline 611. For example, the first data can be received by a data collection module such as data collection module 201. A filtering module (e.g., filtering module 205) can filters data associated with the user device for a predefined time period 607 after the initial observation at time stamp 609. In this instance, the user device accesses non-preselected network locations 603d and 603e during the data filtering time period 607; no access, however, to a preselected network location by the user device is observed during the data filtering time period 607. Therefore, at the end of the data filtering time period 607, at time stamp 613, the filtering of data associated with the user device is stopped. Thus, when the user device accesses non-preselected 603f and 603g, after the time stamp 613, data associated with the user device is not filtered.

In the second example shown in FIG. 6, with visited locations list 601b, similarly, a first data indicating that a user device has accessed a predefined (e.g., suspicious) location 605c is received at time stamp 609 during the user timeline 611. For example, the first data can be received by a data collection module such as data collection module 201. A filtering module (e.g., filtering module 205) can filter data associated with the user device for a predefined time period 617 after the initial observation at time stamp 609. The user device accesses a non-preselected network location 605d during the data filtering period 617.

Subsequently, a second data indicating that the user device has accessed a preselected network location 605e is received at time stamp 615 during the predefined time period 617 (time stamp 615 is before the time stamp 613 when the data filtering period 617 ends). For example, the second data can be received by a data collection module such as data collection module 201. After receiving the second data, a filtering module (e.g., the filtering module 205) resets the filtering timer and restarts the filtering of data associated with the user device from time stamp 615 for a new predefined time period 619. The time period 619 can be equal, longer or shorter than the time period 617. In various instances, if access to preselected network locations is observed during the time period 619, the timer reset by the filtering module is repeated and the data filtering period is restarted. In this example, after accessing the preselected network location 605e, the user device accesses non-preselected network locations 605f and 605g.

These accesses, however, do not affect the data filtering period and the filtering time period 619 ends at time stamp 621.

Figure 7:
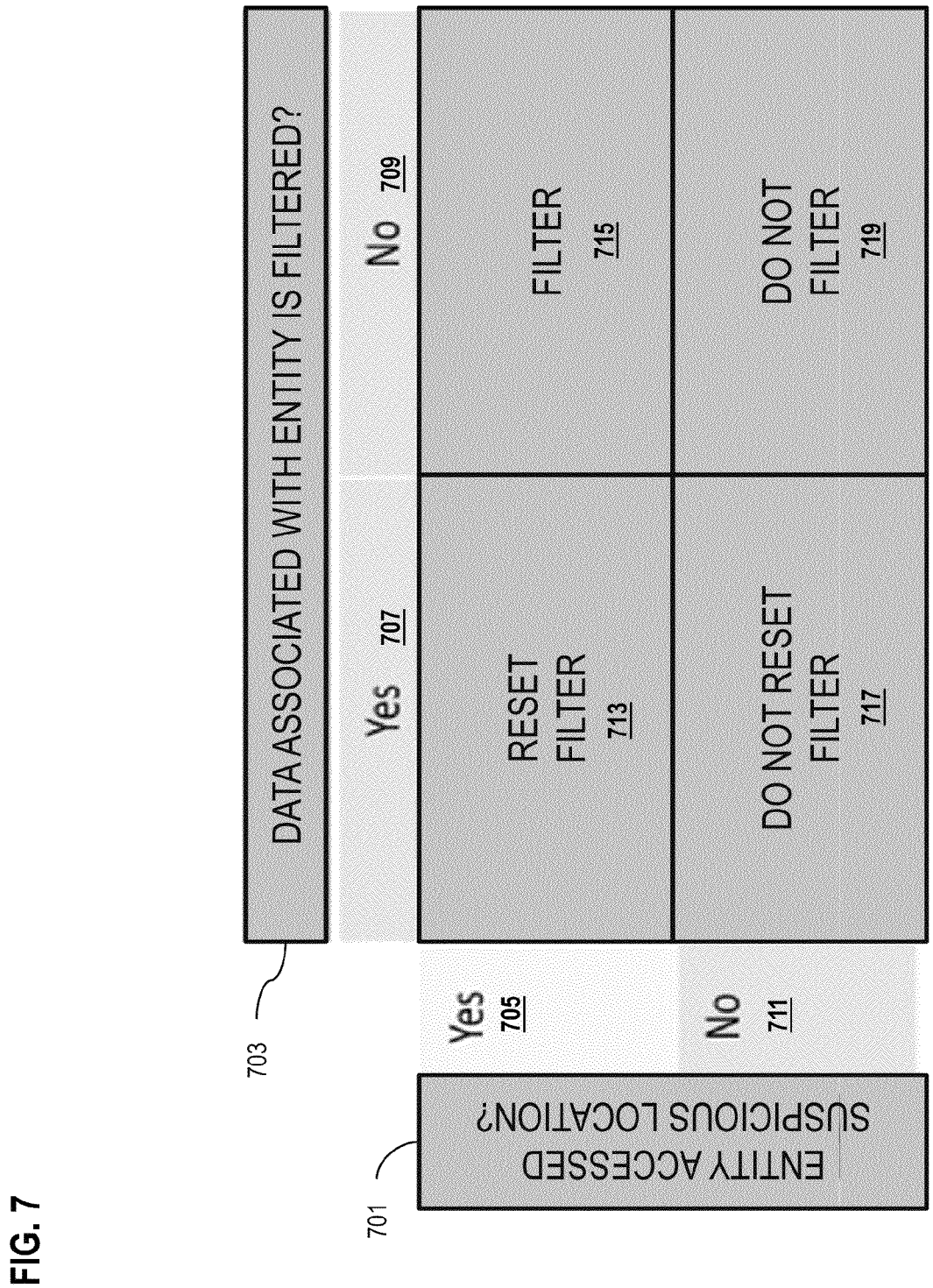
FIG. 7 is an illustration of rules used for data filtering, according to an embodiment.

FIG. 7 is an illustration of rules used for traffic data filtering, according to an embodiment. FIG. 7 highlights the rules associated with the data filtering process that can be performed, for example, by the filtering module 205 of FIG. 2.

If rule 701 is satisfied, data associated with an entity indicates the entity accessed a preselected (suspicious) network location (705) and if rule 703 is not satisfied, data associated with the entity is not filtered (709); then the action 715 is taken and data associated with the entity is filtered. Similarly, if data associated with an entity is not filtered (709) and the entity has not accessed a preselected (suspicious) network location (711); then the action 719 is taken and data associated with the entity is not filtered.

If rule 701 is not satisfied, data associated with the entity does not indicate the entity accesses a preselected (suspicious) network location (711) and if rule 703 is satisfied, data associated with the entity is filtered (707); then the action 717 is taken and the filter is not reset. Thus, after the predefined data filtering period expires, data associated with the entity is unfiltered. Similarly, if data associated with the entity is filtered (707) and data associated with the entity indicates the entity accessed a preselected (suspicious) network location during the data filtering period (705), then the action 713 is taken and the filtering timer of data associated with the entity is reset and filtering of the data associated with the entity is restarted.

In some instances, a network location has forced traffic, at some times and has intended traffic at other times. In such instances, the network locations with temporarily suspicious behavior can be temporarily added to the preselected network locations list such that data associated with the access to those locations by a user device is filtered by the filtering module during the forced traffic periods and not filtered during other time periods without forced traffic. In some instances, the network traffic management platform filters data that is used to define targeted models by a modeling module. For example, the modeling module can disregard data associated with accesses to network locations by entities that are currently filtered.

It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code representing instructions to be executed by a processor, the code comprising code to cause the processor to:
   filter data associated with an entity for a first predefined time period in response to an access by the entity at a first time to a preselected network location from a plurality of preselected network locations, the plurality of preselected network locations being associated with forced web traffic patterns; and
   filter data associated with the entity for a second predefined time period in response to an access by the entity at a second time to a preselected network location from the plurality of preselected network locations during the first predefined time period, the second time being after the first time, an end of the second predefined time period being after an end of the first predefined approval.

2. The non-transitory processor-readable medium of claim 1, the code to filter data associated with the entity for a second predefined time period includes code to cause the processor to:
   send a signal to stop a counter of a number of accesses by the entity to a preselected network location from the plurality of preselected network locations.

3. The non-transitory processor-readable medium of claim 1, the code further comprising code to cause the processor to:
   modify filtering of data associated with the entity in response to receiving a new forced web traffic pattern.

4. The non-transitory processor-readable medium of claim 3, wherein the forced web traffic patterns include at least one temporary period of forced web traffic, the code to cause the processor to modify filtering including code to cause the processor to filter data associated with the entity during the at least one temporary period of forced web traffic.

5. The non-transitory processor-readable medium of claim 1, wherein the entity is associated with at least one of a spyware or a virus.

6. The non-transitory processor-readable medium of claim 1, wherein the data associated with the entity includes bid requests received in an online real-time bidding auction.

7. The non-transitory processor-readable medium of claim 1, further comprising code to cause the processor to:
receive an indication of the entity accessing a first network location at a first time, the first network location being preselected as associated with forced web traffic patterns, the first time being before filtering data associated with the entity for the first time period,
the code to cause the processor to filter data associated with the entity for the first predefined time period including code to cause the processor to filter data from the first network location and data from a second network location not being preselected as being associated with forced web traffic patterns.

8. The non-transitory processor-readable medium of claim 1, wherein:
the data associated with the entity includes data from the preselected network location and data from a network location not included within the plurality of preselected network locations,
the data from the second network location not included within the plurality of preselected network locations being produced in response to the entity accessing the second network location not included within the plurality of preselected network locations.

9. The non-transitory processor-readable medium of claim 1, wherein:
the code to cause the processor to filter data associated with the entity for a first predefined time period includes code to cause the processor to:
receive data associated with the entity during the first predefined time period; and
delete a first datum associated with forced web traffic; and
the code to cause the processor to filter data associated with the entity for a second predefined time period includes code to cause the processor to:
receive data associated with the entity during the second predefined time period; and
delete a second datum associated with forced web traffic.

10. A non-transitory processor-readable medium storing code representing instructions to be executed by a processor, the code comprising code to cause the processor to:
receive a first datum associated with an access by an entity to a preselected network location from a plurality of preselected network locations, the plurality of preselected network locations being associated with forced web traffic patterns;
send a first signal to filter data associated with the entity for a predefined time period based, at least in part, on the first datum;
receive a second datum associated with an access by the entity to a website location during the first predefined time period; and
send a second signal to modify filtering of data associated with the entity based, at least in part, on the second datum.

11. The non-transitory processor-readable medium of claim 10, wherein the predefined time period is a first predefined time period, the code to cause the processor to send the second signal to modify filtering comprising code to cause the processor to:
send a signal to stop filtering data associated with the entity if the second datum indicates no access to a preselected network location from the plurality of preselected network locations during the predefined time period; and
send a signal to filter data associated with the entity for a second predefined time period if the second datum indicates at least one access to a preselected network location from the plurality of preselected network locations during the first predefined time period, an end of the second predefined time period being after an end time of the first predefined time period.

12. The non-transitory processor-readable medium of claim 11, wherein a length of the first predefined time period equals a length of the second predefined time period.

13. The non-transitory processor-readable medium of claim 10, wherein the entity is associated with at least one of a spyware or a virus.

14. The non-transitory processor-readable medium of claim 10, wherein the code to cause the processor to send the second signal to modify filtering includes code to cause the processor to:
send a signal to stop a counter of a number of accesses by the entity to any of the plurality of preselected network locations.

15. The non-transitory processor-readable medium of claim 10, wherein the code to cause the processor to send the second signal to modify filtering includes code to cause the processor to:
send a signal to start a counter of number of accesses by the entity to any of the plurality of preselected network locations if the second datum indicates no access to a preselected network location from the plurality of preselected network locations during the predefined time period.

16. The non-transitory processor-readable medium of claim 10, wherein the data associated with the entity includes a bid request received in an online real-time bidding auction.

17. The non-transitory processor-readable medium of claim 10, wherein the forced web traffic patterns include at least one temporary period of forced web traffic, the code to cause the processor to send the second signal to modify filtering includes code to cause the processor to send the second signal to filter data associated with the entity during the at least one temporary period of forced web traffic.

18. The non-transitory processor-readable medium of claim 7, wherein:
the first signal is a signal to remove a third datum from data associated with the entity, the third datum associated with forced web traffic; and
the second signal is a signal to remove a fourth datum associated with forced web traffic from data associated with the entity, the fourth datum associated with forced web traffic.

19. The non-transitory processor-readable medium of claim 10, further comprising code to cause the processor to:
send a signal to stop filtering data associated with the entity after an end of the predetermined time period in response to not receiving a datum associated with an access by the entity to any of the plurality of network locations.

20. A non-transitory processor-readable medium storing code representing instructions to be executed by a processor, the code comprising code to cause the processor to:
receive data associated with an access by an entity to a network location from a plurality of preselected network locations, during a first predefined time period;
define a model of behavior for the entity based, at least in part, on the data; and send a signal to filter data associated with the entity for a second predefined time period based, at least in part, on the model of behavior of the entity, an end of the second predefined time period being after an end of the first predefined time period.

21. The non-transitory processor-readable medium of claim 20, the code further comprising code to cause the processor to:
send a signal to stop filtering data associated with the entity based, at least in part, on the model of behavior of the entity.

22. The non-transitory processor-readable medium of claim 20, wherein the code to cause the processor to send a signal to filter data includes code to cause the processor to send a signal to filter data based on simultaneous multiple access to a network location from the plurality of preselected network locations by a plurality of entities.

23. The non-transitory processor-readable medium of claim 20, wherein the network location is a first network location, the code further comprising code to cause the processor to:
receive data associated with an access to a second network location by the entity during the first predefined time period; and
define the model of behavior for the entity based, at least in part, on the data associated with the access to the second network location by the entity.

24. The non-transitory processor-readable medium of claim 20, the code further comprising code to cause the processor to:
define a forced web traffic pattern based, at least in part, on the model of behavior of the entity, the code to cause the processor to send the signal to filter being based on the forced web traffic pattern.

25. The non-transitory processor-readable medium of claim 24, wherein:
the code to cause the processor to send the signal to filter is based on a plurality of forced web traffic patterns,
the plurality of forced web traffic patterns are based, at least in part, on a plurality of models of behavior of a plurality of entities, the plurality of entities including the entity.

26. The non-transitory processor-readable medium of claim 20, wherein the signal to filter data associated with the entity for the second predefined time period is a signal to delete a datum associated with forced web traffic from data associated with the entity.

* * * * *